May 17, 1949.  A. L. BROWNLEE  2,470,467
STATOR UNIT FOR FLYWHEEL MAGNETOS
Filed May 21, 1948  3 Sheets-Sheet 1
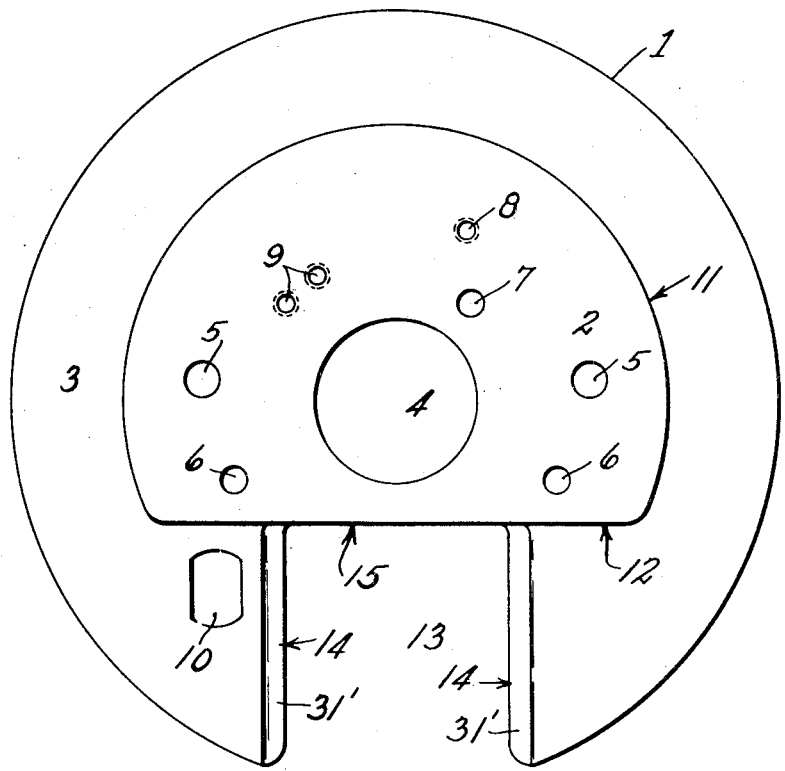
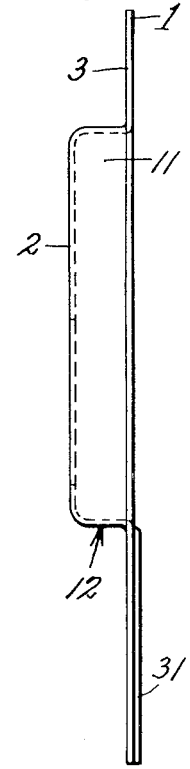
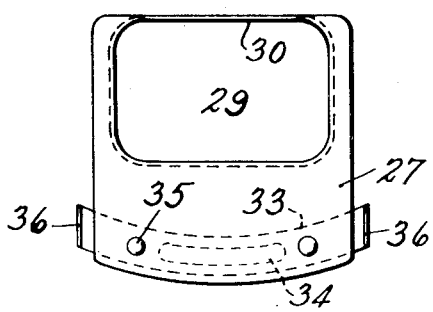
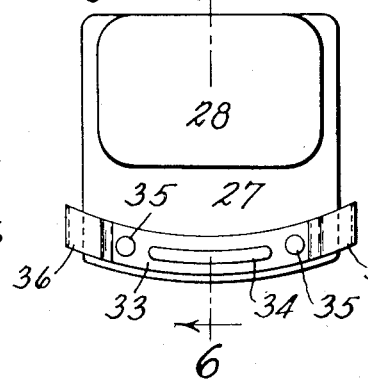
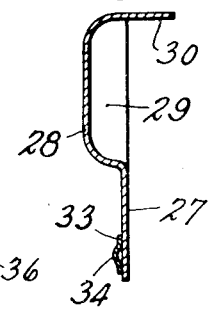
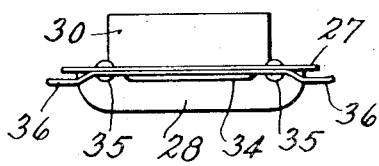
INVENTOR
ALLEN L. BROWNLEE
BY Chapin + Neal
ATTORNEYS May 17, 1949.  A. L. BROWNLEE  2,470,467
STATOR UNIT FOR FLYWHEEL MAGNETOS
Filed May 21, 1948  3 Sheets-Sheet 2
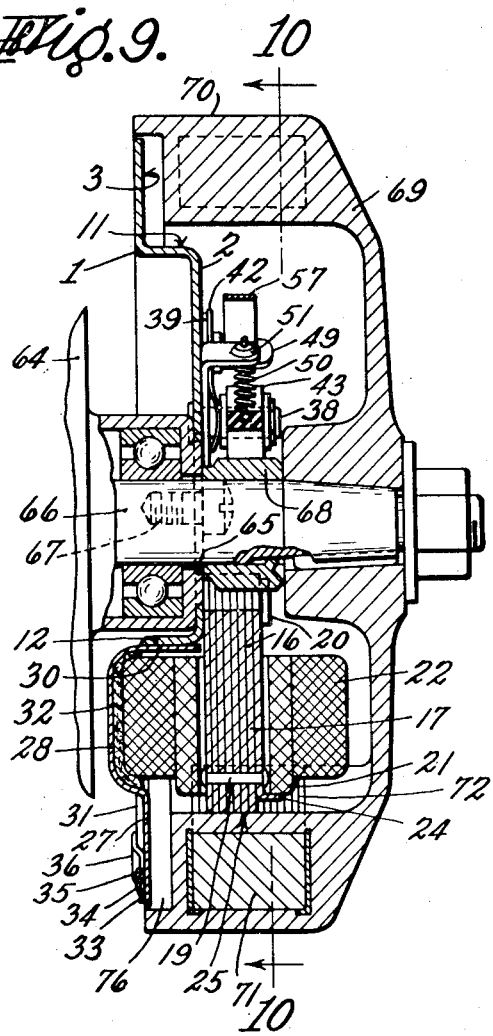
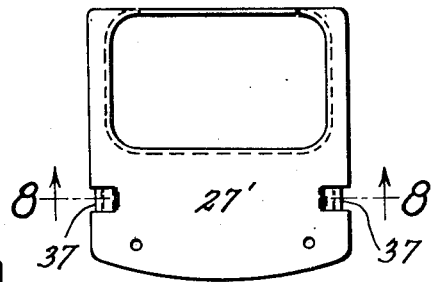
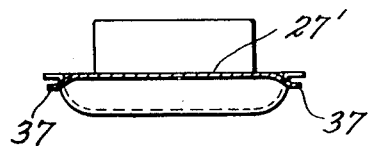
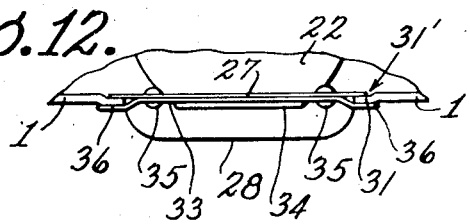
INVENTOR
*Allen L. Brownlee*
BY
*Chapin & Neal*
ATTORNEYS May 17, 1949.  A. L. BROWNLEE  2,470,467
STATOR UNIT FOR FLYWHEEL MAGNETOS
Filed May 21, 1948  3 Sheets-Sheet 3
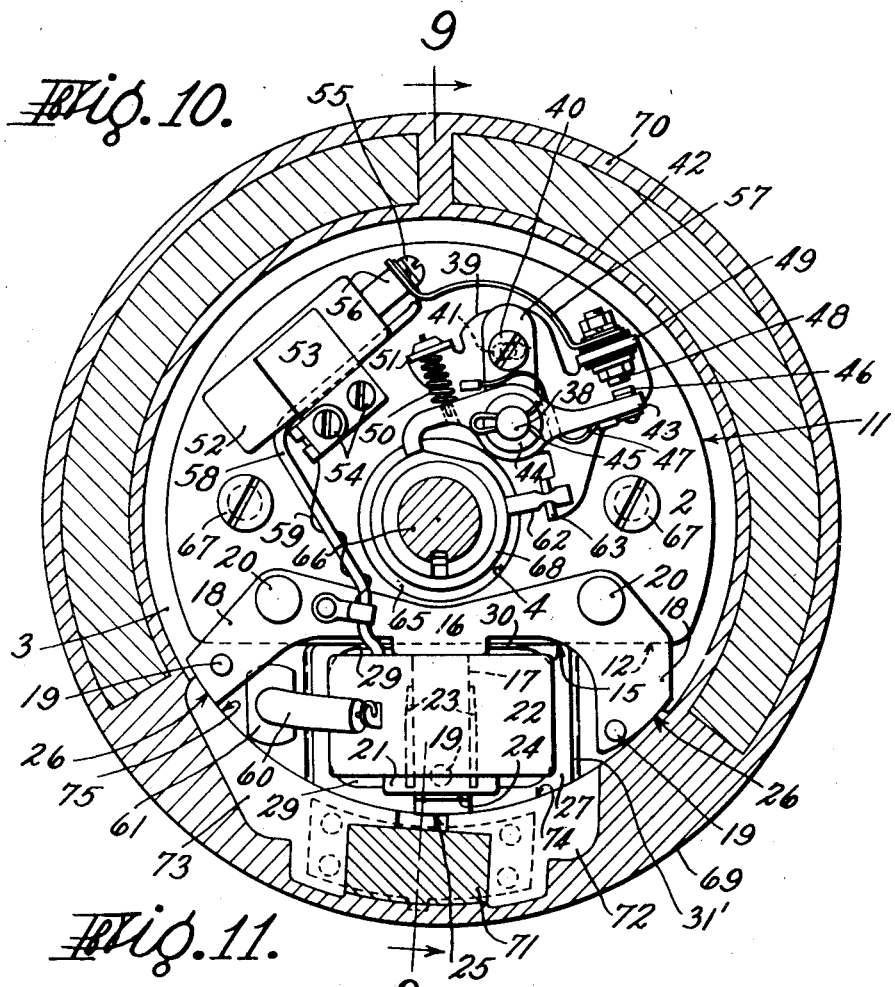
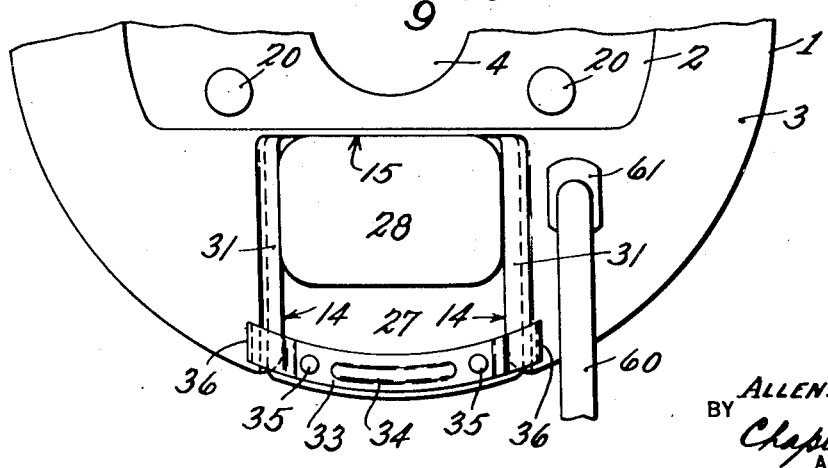
INVENTOR
ALLEN L. BROWNLEE
BY Chapin + Neal
ATTORNEYS Patented May 17, 1949

2,470,467

UNITED STATES PATENT OFFICE 2,470,467

STATOR UNIT FOR FLYWHEEL MAGNETOS

Allen L. Brownlee, West Springfield, Mass., assignor to Wico Electric Company, West Springfield, Mass., a corporation of Massachusetts Application May 21, 1948, Serial No. 28,283

5 Claims. (Cl. 171—209)

This invention relates to an improved stator unit for flywheel magnetos.

A stator unit usually consists of a supporting plate, an armature involving magnetic core structure with primary and secondary generating coils thereon, and breaker point mechanism, adapted to be actuated from the engine crankshaft to control the primary coil circuit. The armature core structure cooperates with the pole shoes of a permanent magnet, both shoes and magnet being mounted in the flywheel of the engine. All parts of the stator unit are located inside the engine flywheel, and desirably the plate and flywheel cooperate to provide a substantially dust tight enclosure for such parts.

The invention finds one advantageous use in flywheel magnetos for relatively small engines, such as those used on motorized scooters, bicycles and the outboard motors of small boats. The flywheels of such engines are of relatively small diameter and the space available within them is very limited.

The invention has for an object the provision of a stator unit for a flywheel magneto of the class in which the stator plate is adapted to cooperate with the engine flywheel to provide an enclosure for the magneto parts and which may be made better and at less expense than the stator units of the prior art with which I am familiar.

The invention also has for an object to provide a stator unit of the class described, in which the stator plate may be made as a steel stamping, without having the magnetic material adversely affect the output of the magneto.

The invention also has for an object the provision of a stator unit of the class described for a flywheel magneto, in which space limitations are so small that the generating coil has to extend outwardly beyond the plane of the circular stator plate, an arrangement enabling the coil to be mounted on the armature core structure, after it has been permanently attached to the stator plate and machined and thereafter enabling the coil to be removed and replaced, whenever required, without removal of the armature core structure from the stator plate.

These and other objects and advantages will more particularly appear from the detailed description of one illustrative example of the invention in the accompanying drawings, in which, Figs. 1 and 2 are full-size front and side elevational views, respectively, of the stator plate element of a stator unit embodying the invention;

Figs. 3, 4 and 5 are full-size front, rear and end elevational views of the cover or shield element of the stator unit;

Fig. 6 is a sectional view taken on the line 6—6 of Fig. 4;

Fig. 7 is a front elevational view of a modified form of cover or shield;

Fig. 8 is a sectional view taken on the line 8—8 of Fig. 7;

Fig. 9 is a full-size sectional elevational view of a flywheel magneto embodying the stator unit of this invention, taken on the line 9—9 of Fig. 10;

Fig. 10 is a full-size cross sectional view of such magneto, taken on the line 10—10 of Fig. 9; and Figs. 11 and 12 are fragmentary rear elevational and bottom plan views of the stator unit.

Referring to these drawings; the stator unit of the magneto includes a stator plate 1, shown separately in Figs. 1 and 2, and comprising a circular member having a platform 2, located in a plane spaced from but parallel with the plane, in which the marginal portion 3 of the plate is located. Extending through the platform is a central hole 4 adapted to fit over a cylindrical part on the engine crankcase to locate the plate coaxially of the engine crankshaft and two holes 5, through which screws may be applied to clamp the plate to the engine crankcase. The plate also has two holes 6 for core rivets, a hole 7 for the breaker lever stud, a threaded hole 8 for the breaker mounting plate screw, two threaded holes 9 for the condenser clip screws; and a hole 10 to receive the insulator for the spark plug wire. The platform 2, as shown, is segmental in form and is connected to the portion 3 of the plate by a curved wall 11, of more than 180° located coaxially of the plate, and by a flat wall 12, both walls 11 and 12 being at right angles to the parts 2 and 3. The plate also has in its marginal portion 3 a deep and wide slot 13, extending from the outer periphery of such portion inwardly to the flat wall 12 of the platform 2 and having two side walls 14 and an inner wall 15, interconnecting the inner ends of the side walls. A plate, such as described, may be formed as a sheet metal stamping with the various holes 5, 6, 7, 8, 9 and 10 and the slot 13 punched out at the same time that the plate, with its struck out platform 2, is formed. The plate 1 may for example, be formed of steel, as being relatively inexpensive, although the invention in all its aspects is not confined to the use of such metal.

The stator unit (Fig. 10) also includes an armature core structure made up of laminations of magnetic material and comprising an inner portion 16, and a central core 17 together with two legs 18, all of which radiate from the inner part 16. The laminations of this structure are suitably held together, as by rivets 19, one near the outer end of each leg and one near the outer end of core 17. This armature structure is permanently fixed to the platform 2 of the stator plate 1, as by means of rivets 20 which pass through the inner part 16 and extend through the holes 6. The core 17 extends radially outward at right angles to wall 12 and along the center line of slot 13. The core 17 (Fig. 9) is thus spaced inwardly from the marginal portion 3 of the plate for receiving a generating coil or coils. As shown, a primary coil 21 and a secondary coil 22 which encompasses it, are mounted on core 17 and suitably held in place thereon, as by wedges 23 (Fig. 10) and by bending an outer lamination of the core over against the outer end face of coil 22 as shown at 24 in Fig. 9. The radius of coil 22 is greater than the perpendicular distance from the center of core 17 to the inner face of the marginal portion 3 of plate 1. Space limitations within the engine flywheel compel such arrangement and necessitate that the plate be provided with a recess to receive part of coil 22. Preferably, this recess is in the form of a slot such as slot 13 which extends from the platform 2 to the outer periphery of the plate and enables the coils 21 and 22 to be slid radially inward on the core 17 after the armature core structure has been permanently secured to the platform 2 and after the convex outer ends, such as 25 and 26 of core 17 and legs 18, respectively, have been accurately machined to lie in coaxial relation with the central hole 4. The coils 21 and 22 can later be removed and replaced by way of slot 13, whenever required, without removing the armature core structure from the stator plate.

The slot 13 is provided for two reasons—first because if the plate 1 is made of magnetic material, any such material which lies near coil 22 must be removed in order to avoid a serious loss in the flow of flux through core 17 that would otherwise occur by a shunt path (Fig. 9) from the inner part of the laminated structure through plate 1 to the magnet in the magnetic rotor and, second, because of space limitations, part of the coil 22 must extend outwardly beyond the marginal portion 2 of the plate 1. While the coil 22 could project through a hole in plate 1, it could not then be removed without first removing the armature structure from plate 1. With the slot 13, the coils 21 and 22 can be readily removed or replaced, when required. It is desirable to cover the slot 13 to exclude dust and dirt from the magneto parts which as will appear are housed within the flywheel and to protect the coil 22. For this purpose, a cover, shown separately in Figs. 3, 4, 5 and 6 is used. This cover is made up of thin material, which is insulating, waterproof and non-magnetic. One suitable material is heavy paper impregnated with wax to stiffen it and make it waterproof. This cover or shield comprises a flat part 27 pressed out near one end, as at 28, to form a socket or recess 29 to receive the projecting part of coil 22, and a flange 30 upstanding at right angles from the body of the plate at the inner end thereof. The width of the stamped out part 28 is just slightly less than that of slot 13 but the entire cover is wider than the slot so that there are marginal side portions which extend one beyond each side 14 of the slot and rest against the inner surface of plate 1. Preferably, the plate is struck outwardly slightly, as at 31, adjacent the side edges 14, forming ways 31' to receive the marginal side portions of the cover and allow the inner face of such portions to lie flush with the inner face of plate 1. The length of the cover equals the radial length of slot 13 and the flange 30 abuts the wall 12 of platform 2 and lies between it and the adjacent end of coil 22 to insulate and protect the latter. Preferably, some readily yieldable material, such as felt 32 (Fig. 9) is placed in the recess 29 before coil 22 is placed therein so as to fill up any clearance spaces that might otherwise exist between the periphery of the coil 22 and the curved wall of the recess and between each end wall of the recess and the adjacent end wall of the coil 22. The coil 22 is placed in the recess 29, compressing the felt 32, and then this coil is slid inwardly on core 17, carrying with it the cover, the margins of which slide along the ways 31'. The coil 22 is relied on to press the cover outwardly and press the side marginal portions tightly against the ways 31' and to hold the cover against radial movement by the engagement of its ends with the end walls of recess 29. Where the flange 30 is used, this may also by abutment with the platform 2, limit the inward movement of the cover.

It is desirable to stiffen the outer end of the cover and, for this purpose, a narrow metal strip 33 (Figs. 4 and 5), preferably struck up as at 34 to form a stiffening rib, is riveted as at 35 to the cover near its outer end. The ends 36 of this strip 33 may engage the outer face of plate 1 (Fig. 12) near the outer end of the slot. These ends 36 serve as spring fingers to grip plate 1 between them and the marginal portions of the cover. Their extreme ends are bent inwardly to engage the edges of the struck out parts 31 and thereby hold the cover against lateral displacement. A modification of this arrangement is shown in Figs. 7 and 8, where ears 37 are struck out from the cover 27' and function like the fingers 36 to engage the outer face of plate 1.

The remaining elements of the stator unit consist of breaker mechanism and an associated condenser. The breaker mechanism (Figs. 9 and 10) includes a stud 38, the inner end of which is placed in hole 7 and riveted over against the outer face of plate 1. A base plate 39 is pivoted on stud 7 and and is arranged to be clamped to plate 1 in various positions of angular adjustment by means of a screw 40 which passes through a curved slot 41 formed in the base plate coaxially with stud 38. This screw 40 also holds in place the outer end of a flat spring 42, the inner end of which is forked to straddle stud 38. A breaker arm 43 is pivotally mounted intermediate its ends on stud 38 and yieldingly held by spring 42 against a washer 44, which in turn is pressed against a hairpin-like fastener 45, engaged in a circumferential groove near the outer end of stud 38. Arm 43 at one end, carries a breaker point 46 which is connected by a flexible conductor 47 to plate 39 and thereby grounded. A fixed but adjustable breaker point 48 is fixed to, and insulated from, an ear 49 on plate 39. A spring 50 acts between another ear 51 on plate 39 and arm 43 to hold the breaker points engaged and the inner end of the arm, as will appear, against the periphery of an actuating cam. The condenser is mounted in a metallic case 52 to which one of its terminals is connected. This case is held to plate 1, and thereby grounded, by means of a clip 53 and two screws 54, threaded into the described holes 9. The other terminal of the condenser consists of a post 56 and a binding screw 55 which is connected by conductors 57 and 58 to the insulated breaker point 48 and one terminal of the primary coil 21, respectively. The other terminal of coil 21 and one terminal of coil 22 are connected to a wire 59 which is grounded by connection to one of the screws 54. The other terminal of coil 22 is connected to a spark plug wire 60 which passes through an insulator 61 mounted in the hole 10 of plate 1. The part 62 is a cam wiper suitably fixed to an ear 63 on plate 39.

The stator unit described is adapted to be mounted as shown in Figs. 9 and 10 on an engine crankcase 64. The central hole 4 in the stator plate 1 is placed on a pilot hub 65 on the crankcase, whereby to locate it coaxially of the engine crankshaft 66 and flywheel. The plate 1 is then clamped to the crankcase by two screws 67 applied through the holes 5 and threaded into the crankcase. An actuating cam 68 is fixed to crankshaft 66 and then the flywheel 69 is fixed on the crankshaft. The flywheel is of non-magnetic metal and has embedded in its annular rim 70 a permanent magnet 71 and two pole shoes 72 and 73 magnetically connected one to each polar extremity of the magnet. These shoes have concave surfaces 74 and 75 coaxial with the convex surfaces 25 and 26 and of slightly greater radius. The flywheel also has near its inner end a groove 76 to receive the outer marginal portion of the stator plate 1 and to form with such plate an enclosure for all the parts carried by the plate 1.

The operation of the magneto is the usual one for magnetos of this kind. The flywheel 69 and cam 68 revolve clockwise, as viewed in Fig. 10. When the surface 75 of the leading pole shoe 73 overlaps the surface 25 of core 17, the surface 74 of the trailing pole shoe 72 will overlap the surface 26 of the right hand leg 18. A magnetic circuit will then be established from magnet 71 through shoe 72, right hand leg 18, the right hand part of member 16, core 17 and shoe 73 back to the magnet. The breaker points 46 and 48, which have previously been held open, are allowed by cam 68 to close and hold the magnetic flux in said circuit until the surface 75 of the leading pole shoe 73 overlaps the surface 26 of the left hand leg 18 and the surface 74 of the trailing shoe 72 has overlapped the surface 25 of core 17. The parts are then positioned as shown in Fig. 10. The cam 68 has opened the breaker points, while a magnetic circuit is established in a reverse direction through core 17. This circuit is from magnet 71, shoe 72, core 17, left hand part of member 16, left hand leg 18 and shoe 73 back to the magnet. The sudden change in flux through core 17 generates an electromotive force in coil 22. The cam 68 holds the breaker points open until the flywheel again reaches the point where the first-described magnetic circuit is established.

The invention provides a better stator unit for a small flywheel magneto than has been possible heretofore, in cases where the stator plate cooperates with the engine flywheel to form an enclosure for the magneto parts and where the secondary coil, such as 22, has to project outwardly beyond the inner face of the flat marginal portion, such as 3, of the stator plate. This unit is better because the armature core structure can be permanently secured to the stator plate and then machined to make the surfaces 25 and 26 of the exact radius required and to bring them with close accuracy into true coaxial relation with the cooperating surfaces 74 and 75 of the pole shoes of the magnetic rotor. This machining operation can be performed, as it should be, before the coils are placed on core 17. Once the armature core structure has been machined, it need not and should not be removed. The coils can be placed on core 17 without requiring removal of the core structure from the plate because of the provision of the radial slot 13. Heretofore, the machining has been performed while the coils are on the cores and there is a danger of mechanical injury to the coils. The stator unit is also better because removal and replacement of the coils for servicing can be effected without disturbing the accurate location of the armature core structure on the stator plate. Heretofore, in magnetos of this kind, removal of the core structure was required, whenever removal of the coils was necessary. Therefore, such structure had to be fastened to the stator plate by screws and dowel pins in order to enable the core structure to be replaced as closely as possible in proper position on the stator plate after it had been removed. As a consequence, the mounting of the core structure on the stator was relatively expensive because of the relatively expensive materials and the skilled labor required. The present core structure can be fastened in place without necessitating skilled labor or expensive materials. A simple and inexpensive riveting operation is all that is required.

The invention also enables the stator plate to be manufactured in quantities at low unit cost because steel can be used as the material and the plate can be formed in one operation as a stamping. Magnetic material can be used for the plate because of the slot 13 which does away with any magnetic material at a location in back of or near the coils and core 17. Such magnetic material, if not removed, would shunt part of the flux from core 17 and lower the output of the magneto.

The invention also provides a cover for the slot 13 to complete the enclosure of the magneto parts within the engine flywheel. This cover is inexpensive but effective. It moves with the coil, when the latter is placed on or removed from the core, and is held in position by the coils when the latter are locked in place on core 17. The metallic part 33 also constitutes a desirable feature. It stiffens the cover 27 where stiffening is most needed near its outer end, and it contributes to holding the cover tightly against its ways 31 in the stator plate to make a tight seal between the plate and cover to keep out dirt and moisture. The cover also furnishes desirable mechanical protection for the back part of the secondary coil which would otherwise be exposed and increases the insulation between it and the engine crankcase.

The invention thus provides an improved stator unit for small flywheel magnetos and enables important economies in manufacture and easier servicing.

I claim:

1. A stator unit for a flywheel magneto, comprising, a circular steel plate having a slot which extends from its outer periphery inwardly toward but terminates short of its center and which has two spaced side walls and an inner wall interconnecting the inner ends of the side walls, a laminated armature structure including an inner part located between the inner wall of the slot and the center of the plate and permanently secured to the latter and a core extending from said inner part outwardly along the center line of said slot, a generating coil mounted on said core and capable of being moved radially on or off the core through said slot, and a cover for said slot of thin insulating and non-magnetic material, said cover consisting of a flat piece of a length to fill said slot and of a width greater than said slot with marginal portions overlapping said side walls and lying against the inner face of said plate, said cover having a portion bent outwardly to form a recess to receive part of said coil and extending outwardly through said slot, the engagement of the coil with said portion serving to hold the marginal portions of said flat part of the cover pressed against the inner face of said plate.

2. A stator unit for a flywheel magneto, comprising, a circular steel plate having a slot which extends from its outer periphery inwardly toward but terminates short of its center and which has two spaced side walls and an inner wall interconnecting the inner ends of the side walls, a laminated armature structure including an inner part located between the inner wall of the slot and the center of the plate and permanently secured to the latter and a core extending from said inner part outwardly along the center line of said slot, a generating coil mounted on said core and capable of being moved radially on or off the core through said slot, a cover for said slot of thin insulating and non-magnetic material, said cover consisting of a flat piece of a length to fill said slot and of a width greater than said slot with marginal portions overlapping said side walls and lying against the inner face of said plate, said cover having a portion bent outwardly to form a recess to receive part of said coil, such portion extending outwardly through said slot, said recess having a curved wall engaged by part of the periphery of said coil to hold the marginal portions of said flat part of the cover pressed against the inner face of said plate, and spring fingers secured to said cover near its outer end and frictionally engaging the outer face of said plate one on each side of said slot to hold the cover against radial displacement in said slot.

3. A stator unit for a flywheel magneto, comprising, a circular steel plate having a slot which extends from its outer periphery inwardly toward but terminates short of its center and which has two spaced side walls and an inner wall interconnecting the inner ends of the side walls, a laminated armature structure including an inner part located between the inner wall of the slot and the center of the plate and permanently secured to the latter and a core extending from said inner part outwardly along the center line of said slot, a generating coil mounted on said core and capable of being moved radially on or off the core through said slot, a cover for said slot of thin insulating and non-magnetic material, said cover consisting of a flat piece of a length to fill said slot and of a width greater than said slot with marginal portions overlapping said side walls and lying against the inner face of said plate, said cover having a portion bent outwardly to form a recess to receive part of said coil, such portion extending outwardly through said slot, said recess having a curved wall engaged by part of the periphery of said coil to hold the marginal portions of said flat part of the cover pressed against the inner face of said plate, and a reenforcing member secured to the cover across and near the outer end thereof with its end portions bent outwardly from the cover and frictionally engaging the outer face of said plate.

4. A stator unit for a flywheel magneto, comprising, a circular plate having a slot which extends from its outer periphery inwardly toward but terminates short of its center and which has two spaced walls and an inner wall interconnecting the inner ends of the side walls, a laminated armature structure including an inner part located between the inner wall of the slot and the center of the plate and permanently secured to the latter and a core extending from said inner part outwardly along the center line of said slot, a generating coil mounted on said core and capable of being moved radially on or off the core through said slot, a cover for said slot of thin insulating and non-magnetic material, said cover consisting of a flat piece of a length to fill said slot and of a width greater than said slot and overlapping the same with marginal portions lying against the inner face of said plate, said cover having a portion bent outwardly to form a recess to receive part of said coil, such portion extending outwardly through said slot, said recess having a curved wall engaged by part of the periphery of said coil to hold the marginal portions of said flat part of the cover pressed against the inner face of said plate and two end walls engaged one with each of the two ends of the coil, whereby to hold the cover against radial displacement in said slot, and a reenforcing member secured to the cover across and near the outer end of the same with its end portions bent outwardly from the cover and engaging the outer face of said plate.

5. A stator unit for a flywheel magneto, comprising, a circular pressed steel plate having an outer marginal portion located in one plane and an inner platform located in a plane spaced inwardly from and parallel with the first-named plane, said plate having a slot extending from its outer periphery inwardly to one side of said platform, an armature structure made up of laminations of magnetic material and having an inner portion riveted to said platform and a core extending from the inner part outwardly along the slot toward but terminating short of the periphery of the plate, a coil mounted on said core and having a part projecting outwardly through the slot beyond the outer face of the marginal portion of said plate, said coil being movable axially on and off said core by way of said slot, and a cover for said slot of thin insulating and non-magnetic material, said cover consisting of a flat part of an area large enough to cover said slot and overlap the sides of the same with marginal portions lying against the inner face of said plate said cover having a portion bent outwardly to form a recess to receive said part of said coil, such portion extending outwardly through said slot, said recess having a curved wall engaged by part of the periphery of said coil to hold the marginal portions of said flat part of the cover pressed against the inner face of said plate.

ALLEN L. BROWNLEE.

No references cited.